United States Patent
Chudgar et al.

(10) Patent No.: US 10,972,390 B2
(45) Date of Patent: Apr. 6, 2021

(54) TCP SEGMENTATION OFFLOAD IN A SERVER ON A CHIP

(71) Applicant: Ampere Computing LLC, Santa Clara, CA (US)

(72) Inventors: Keyur Chudgar, San Jose, CA (US); Kumar Sankaran, San Jose, CA (US)

(73) Assignee: Ampere Computing LLC, Santa Clara, CA (US)

( * ) Notice: Subject to any disclaimer, the term of this patent is extended or adjusted under 35 U.S.C. 154(b) by 1009 days.

(21) Appl. No.: 14/045,065

(22) Filed: Oct. 3, 2013

(65) Prior Publication Data

US 2015/0098469 A1    Apr. 9, 2015

(51) Int. Cl.
*H04L 12/741* (2013.01)
*H04L 12/891* (2013.01)
*H04L 12/801* (2013.01)
*H04L 12/863* (2013.01)
*H04L 29/06* (2006.01)

(52) U.S. Cl.
CPC .............. *H04L 45/74* (2013.01); *H04L 47/34* (2013.01); *H04L 47/41* (2013.01); *H04L 47/50* (2013.01); *H04L 69/166* (2013.01)

(58) Field of Classification Search
None
See application file for complete search history.

(56) References Cited

U.S. PATENT DOCUMENTS

| | | | |
|---|---|---|---|
| 6,671,273 B1 * | 12/2003 | Beck | H04L 29/06 370/351 |
| 7,412,488 B2 | 8/2008 | Jha et al. | |
| 7,903,689 B2 | 3/2011 | Niinomi et al. | |
| 7,991,918 B2 | 8/2011 | Jha et al. | |
| 8,306,062 B1 | 11/2012 | Cohen | |
| 8,325,600 B2 | 12/2012 | Connor et al. | |
| 8,417,852 B2 | 4/2013 | Rajagopalan et al. | |
| 8,462,780 B2 | 6/2013 | Vincent et al. | |
| 8,477,806 B2 | 7/2013 | Qiu et al. | |
| 8,549,152 B2 | 10/2013 | Elzur et al. | |

(Continued)

OTHER PUBLICATIONS

Non-Final Office Action for U.S. Appl. No. 13/772,535 dated Aug. 26, 2014.

(Continued)

*Primary Examiner* — Christopher T Wyllie
(74) *Attorney, Agent, or Firm* — Muncy, Geissler, Olds & Lowe, P.C.

(57) ABSTRACT

A system and method are provided for performing transmission control protocol segmentation on a server on a chip using coprocessors on the server chip. A system processor manages the TCP/IP stack and prepares a large (64 KB) single chunk of data to be sent out via a network interface on the server on a chip. The system software processes this and calls the interface device driver to send the packet out. The device driver, instead of sending the packet out directly on the interface, calls a coprocessor interface and delivers some metadata about the chunk of data to the interface. The coprocessor segments the chunk of data into a maximum transmission unit size associated with the network interface and increments a sequential number field in the header information of each packet before sending the segments to the network interface.

12 Claims, 10 Drawing Sheets

(56) References Cited

U.S. PATENT DOCUMENTS

| | | | |
|---|---|---|---|
| 8,565,234 B1 | 10/2013 | Mizrahi et al. | |
| 9,158,713 B1* | 10/2015 | Chudgar | G06F 13/00 |
| 9,300,578 B2* | 3/2016 | Chudgar | H04L 45/74 |
| 2003/0048751 A1 | 3/2003 | Han et al. | |
| 2003/0058870 A1* | 3/2003 | Mizrachi | H04L 69/168 |
| | | | 370/395.52 |
| 2006/0034310 A1* | 2/2006 | Connor | H04L 49/9063 |
| | | | 370/419 |
| 2006/0104303 A1* | 5/2006 | Makineni | H04L 69/161 |
| | | | 370/463 |
| 2007/0014246 A1* | 1/2007 | Aloni | H04L 47/27 |
| | | | 370/252 |
| 2007/0022212 A1 | 1/2007 | Fan | |
| 2007/0064737 A1 | 3/2007 | Williams | |
| 2007/0070903 A1* | 3/2007 | Paparella | H04L 67/327 |
| | | | 370/231 |
| 2007/0076623 A1 | 4/2007 | Aloni et al. | |
| 2007/0086434 A1 | 4/2007 | Venkatachalam et al. | |
| 2007/0223472 A1* | 9/2007 | Tachibana | H04L 47/10 |
| | | | 370/389 |
| 2007/0255802 A1 | 11/2007 | Aloni et al. | |
| 2008/0228967 A1* | 9/2008 | Krig | G06F 13/385 |
| | | | 710/56 |
| 2008/0263171 A1* | 10/2008 | Craft | G06F 13/28 |
| | | | 709/212 |
| 2008/0310420 A1 | 12/2008 | Aloni et al. | |
| 2010/0017535 A1 | 1/2010 | Aloni et al. | |
| 2010/0125777 A1* | 5/2010 | Wang | H03M 13/091 |
| | | | 714/807 |
| 2010/0135324 A1* | 6/2010 | Pope | H04L 69/16 |
| | | | 370/474 |
| 2010/0174824 A1 | 7/2010 | Aloni et al. | |
| 2010/0235522 A1* | 9/2010 | Chen | H04L 67/02 |
| | | | 709/228 |
| 2011/0085549 A1 | 4/2011 | DiMambro | |
| 2011/0246666 A1 | 10/2011 | Aloni et al. | |
| 2011/0310892 A1 | 12/2011 | DiMambro | |
| 2012/0020279 A1* | 1/2012 | Kim | H04B 7/15592 |
| | | | 370/315 |
| 2013/0133067 A1 | 5/2013 | Yoo | |
| 2013/0205037 A1 | 8/2013 | Biswas | |
| 2013/0268688 A1* | 10/2013 | Galanes | H04L 65/605 |
| | | | 709/231 |
| 2013/0343407 A1 | 12/2013 | Stroud et al. | |

OTHER PUBLICATIONS

Final Office Action for U.S. Appl. No. 13/772,535 dated Jan. 9, 2015.

Non-Final Office Action for U.S. Appl. No. 13/772,535 dated Apr. 20, 2015.

Final Office Action for U.S. Appl. No. 13/772,535 dated Sep. 10, 2015.

U.S. Appl. No. 13/772,535, Notice of Allowance and Examiner Initiated Interview Summary dated Nov. 19, 2015.

* cited by examiner

TCP SEGMENTATION OFFLOAD IN A SERVER ON A CHIP

CROSS-REFERENCE TO RELATED APPLICATION

The subject disclosure relates to patent application Ser. No. 13/772,535 filed on Feb. 21, 2013, which is hereby incorporated by reference.

TECHNICAL FIELD

The subject disclosure relates to TCP segmentation offload in a server on a chip environment.

BACKGROUND

In computing networks, when CPUs (central processing units) process data in relatively large chunks, these chunks need to be broken down when sending over a network. This is because the maximum transmission unit size (MTU) of the network is much smaller than the chunks of data that the CPU uses. These smaller segments can then pass through network elements between the source and destination computers. This process is referred to as segmentation, and is necessary to allow computers to communicate with each other over a network.

There are two ways that computers systems currently perform this segmentation. The segmentation can be performed completely in software. In this method, the system CPU, which runs the TCP/IP (transmission control protocol/internet protocol) network stack, performs the segmentation itself using high level software. For example, the TCP/IP layer can send 64 KB chunks of data to the interfaces, and then the software based layer segments the large chunks into small packets that are MTU sized (generally 1518 bytes). The system software then calls the device driver's packet transmit routing to sent these smaller segments out of the system. This method uses the same system processors on which the TCP/IP stack is running, and so therefore, while segmentation is being performed, the system processors can't perform anything else.

In the other method, there are hardware devices, such as network interface cards (NICs) which implement the segmentation function in hardware. The system processors which run the TCP/IP stack sends 64 KB chunks of data to the device driver, which forwards the same large packet to the NIC, where the NIC segments the chunks of data down to MTU sized packets and sends them out over the network interface. NICs take up valuable physical space and are expensive, especially since a separate NIC is required for each network interface a computing system has.

The above-described description is merely intended to provide a contextual overview of current techniques for performing TCP Segmentation and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example embodiment, a server on a chip comprises a system processor configured for sending a batch of data over a network, wherein the system processor stores the batch of data in a memory and generates header information associated with the system processor, wherein the header information specifies an IP address and a size of the batch of data. The server on a chip also comprises a coprocessor configured for receiving the header information and splitting the batch of data into segments, wherein a size of the segments is based on a maximum transmission unit size of a network interface, wherein the coprocessor is also configured for attaching the header information to the segments, wherein a sequential number field of the header information is adjusted based on the number of segments. The server on a chip also comprises a queue manager configured for sending the segments to the address specified in the header information.

In another example embodiment, a method comprises storing, by a system processor, a batch of information in a memory and generating header information that specifies a size of the batch of data and an IP address associated with a destination of the batch of data. The method also includes receiving, by a coprocessor, the header information and splitting the batch of data into a plurality of segments, wherein a size of the segments are based on a maximum transmission unit size of a network interface. The method further comprises attaching the header information to each of the plurality of segments and incrementing a sequential number field of the header information based on the number of segments and directing the segments to a network port based on the IP address specified in the header information.

In an example embodiment, a system comprises a memory to store computer executable instructions, and a plurality of processors, communicatively coupled to the memory that are configured to execute or facilitates execution of the computer executable instructions to perform operations. The operations include receiving a batch of data and header information associated with the batch of data from a system processor, wherein the header information that specifies a size of the batch of data and an IP address associated with a destination of the batch of data. The operations also include determining a maximum transmission unit size of a network interface associated with the IP address and splitting the batch of data into a plurality of segments, wherein a size of the segments are based on a function of the maximum unit transmission size and the size of the batch of data. The operations further comprise attaching the header information to each of the plurality of segments and incrementing a sequential number field of the header information based on the number of segments and forwarding the segments to the network interface.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
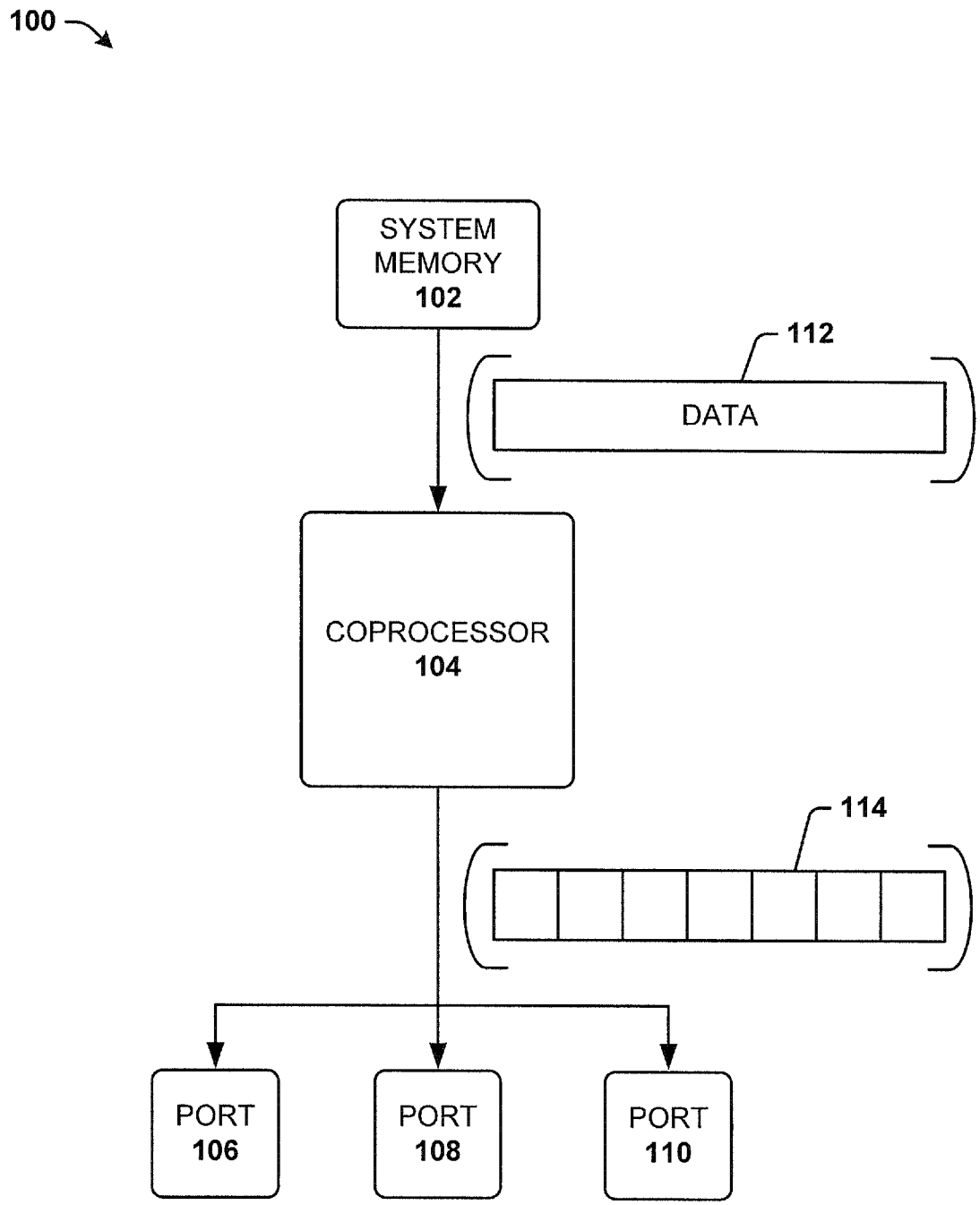
FIG. 1 is a block diagram illustrating an example, non-limiting embodiment of a system that performs data segmentation in accordance with various aspects described herein.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

Various embodiments provide for a system on a chip or a server on a chip that segments large TCP segments into smaller packets and sends them out on the interface with interface specific packet sizes. As a result, the number of packets to be sent out and processed by system network stack is reduced significantly. The number of locks required by the system is also reduced due to the system processors not performing the segmentation. As a result, the system throughput is increased for sending TCP segments and CPU utilization is improved.

A system or server on a chip includes one or more system CPUs which run system software along with a TCP/IP software stack. The system CPUs prepare a large (64 KB) single chunk of data to be sent out via network interfaces on the server on a chip. The system software processes this and calls the interface device driver to send the packet out. The device driver, instead of sending the packet out directly on the interface, calls a coprocessor interface and delivers some metadata about the chunk of data to the interface. The metadata specifies a location of the chunk of data in memory, as well as a size of the data and a destination of the data. The coprocessor interface knows that this is a TCP large single segment based on the packet header/metadata and knows what the starting sequence number of the TCP segment is. The coprocessor interface also knows the MTU size of the outgoing interface. With all of this information, the coprocessor interface knows how many small segments it will need to send out to the interface.

Rather than performing the segmentation in software or by offloading the segmentation to a NIC, the server on a chip performs the TCP segmentation offloading 'in-house' on coprocessors on the server chip. Once segmented, the coprocessors read the packets' Ethernet headers, IPv4 headers, and TCP headers and sends the split packet to the network interface. The network interface has an ability to gather two data buffers and send them out as a single packet. The coprocessor interface use the same header information for the first packet and then reads out MTU size—header size data from the beginning of the large packet (excluding the original packet header) and then adjust the next read pointer in the large packet buffer by incrementing it by the size of data sent out. The coprocessor interface can then adjust the TCP header's sequential number field for keeping count of each sequential segment. The IPv4 header ID field will also be incremented by one for each segment sent out of the interface. As a result, the large packet is sent out as small multiple MTU sized TCP segments. By doing this, the number of packets to be processed by the system CPU is reduced significantly.

Turning now to the illustrations, FIG. 1 illustrates a system 100 that performs data segmentation in accordance with embodiments described herein. System 100 includes a coprocessor 104 that receives a chunk of data 112 from system memory 102, and splits the chunk of data 112 into segments 114 before sending the segments out of one of network interfaces 106, 108, or 110.

In an embodiment, coprocessor 104 can be running an application that is configured for performing TCP segmentation. The coprocessor 104 can receive a call from a device driver associated with a system processor (not shown) and the device driver call can include header information and/or metadata that specifies a location of the data 112 in system memory 102. The coprocessor 104 can then access the data 112 at the location specified in the system memory 102. The header information/metadata specified in the device driver call can also indicate the destination address of the data 112. Based on the destination address, the coprocessor 104 can direct the segmented data 114 to the corresponding network port/interface 106, 108, or 110.

In some embodiments, the system processor sends the data 112 directly from system memory 102 to coprocessor 104. The system processor can also send the header information/metadata with the data 112.

Coprocessor 104 can segment the data 112 based on the header information and metadata. The header information can include information identifying a size of the data 112. The header information can also include the destination address of the data 112. Based on the destination address, the coprocessor 104 can determine which port among ports 106, 108, and 110 (and others in other embodiments) will be used to send the segmented data 114. Each port has a maximum transmission unit size based on the transport system, and coprocessor 104 can segment the data 112 based on the MTU. For instance, if the chunk of data 112 is 64 KB, and the MTU is 1518 bytes, the coprocessor can segment the data 112 into 44 or more segments, wherein each segment is 1518 bytes or less.

Figure 2:
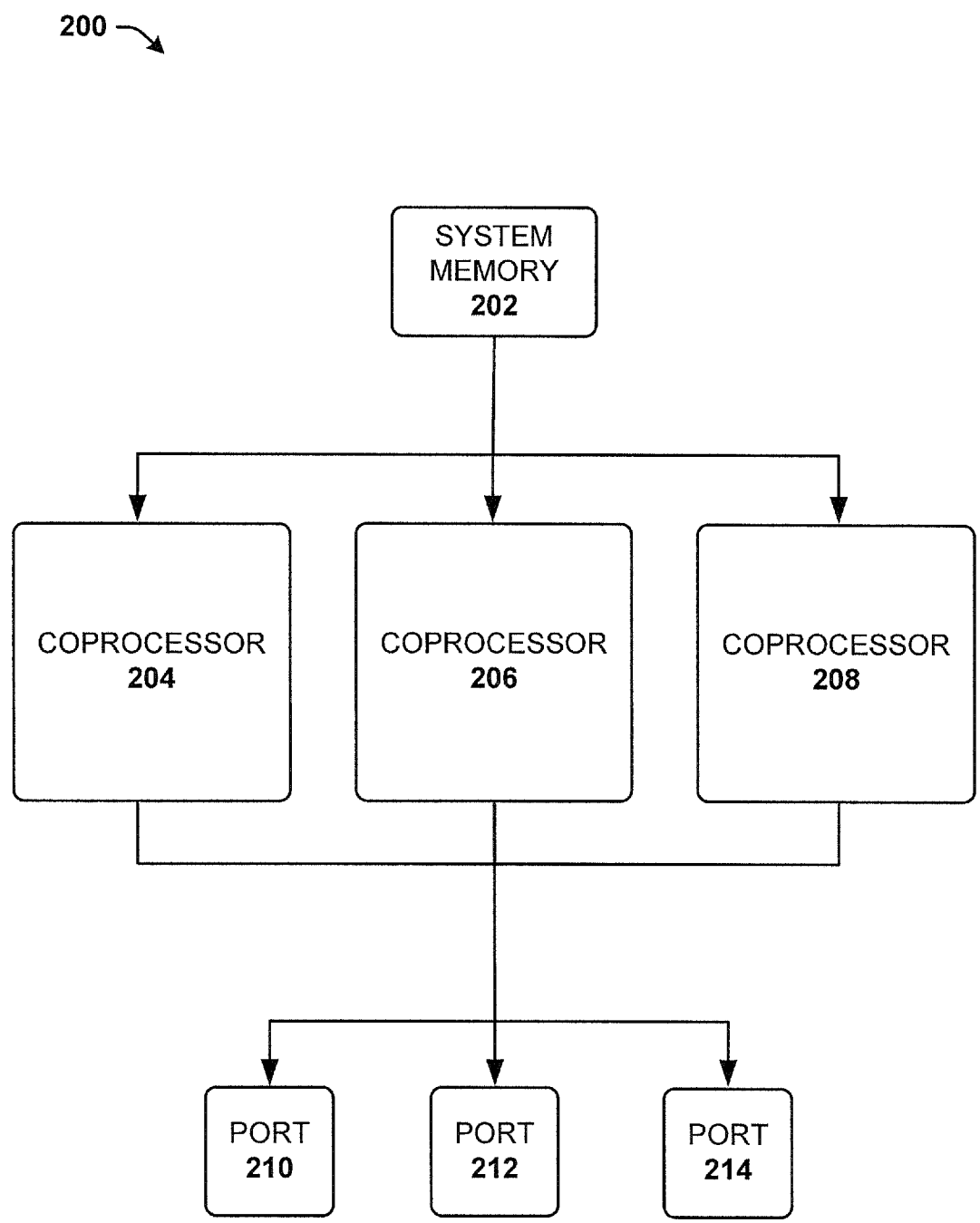
FIG. 2 is a block diagram illustrating an example, non-limiting embodiment of a system that performs data segmentation in parallel in accordance with various aspects described herein.

Turning now to FIG. 2, illustrated is an example, non-limiting embodiment of a system 200 that performs data segmentation in parallel. Coprocessors 204, 206, and 208 can segment chunks of data received from system memory 202 either individually, in combination, or in parallel and send the segmented packets of data to one or more of ports 210, 212, and 214.

In some embodiments, one or more of coprocessors 204, 206, and 208 can receive a device driver call from a system processor (not shown) and the device driver call can include header information and/or metadata that specifies a location of one or more chunks of data in the system memory 202. One or more of the coprocessors 204, 206, and 208 can then access the data at the location specified in the system memory 202. The header information and/or metadata can also indicate the destination address(es) of the chunks of data, and based on the destination address(es) the coprocessors 204, 206, and 208 can direct the segmented packets of data to the corresponding network ports/interfaces 210, 212, and/or 214.

In an embodiment, coprocessors 204, 206, and 208 can segment a packet of data in parallel, where each of the coprocessors 204, 206, and 208 process portions of the packet of data. In other embodiments, coprocessors 204, 206, and 208 can process several packets of data at the same time. For instance, coprocessor 204 can segment a first packet of data at the same time that coprocessor 206 is processing a second packet of data and so forth.

It is to be appreciated that while FIG. 2 shows three coprocessors and three network ports, this is merely a representative embodiment of the disclosure, and that in other embodiments, other numbers and combinations of coprocessors and ports are possible.

Figure 3:
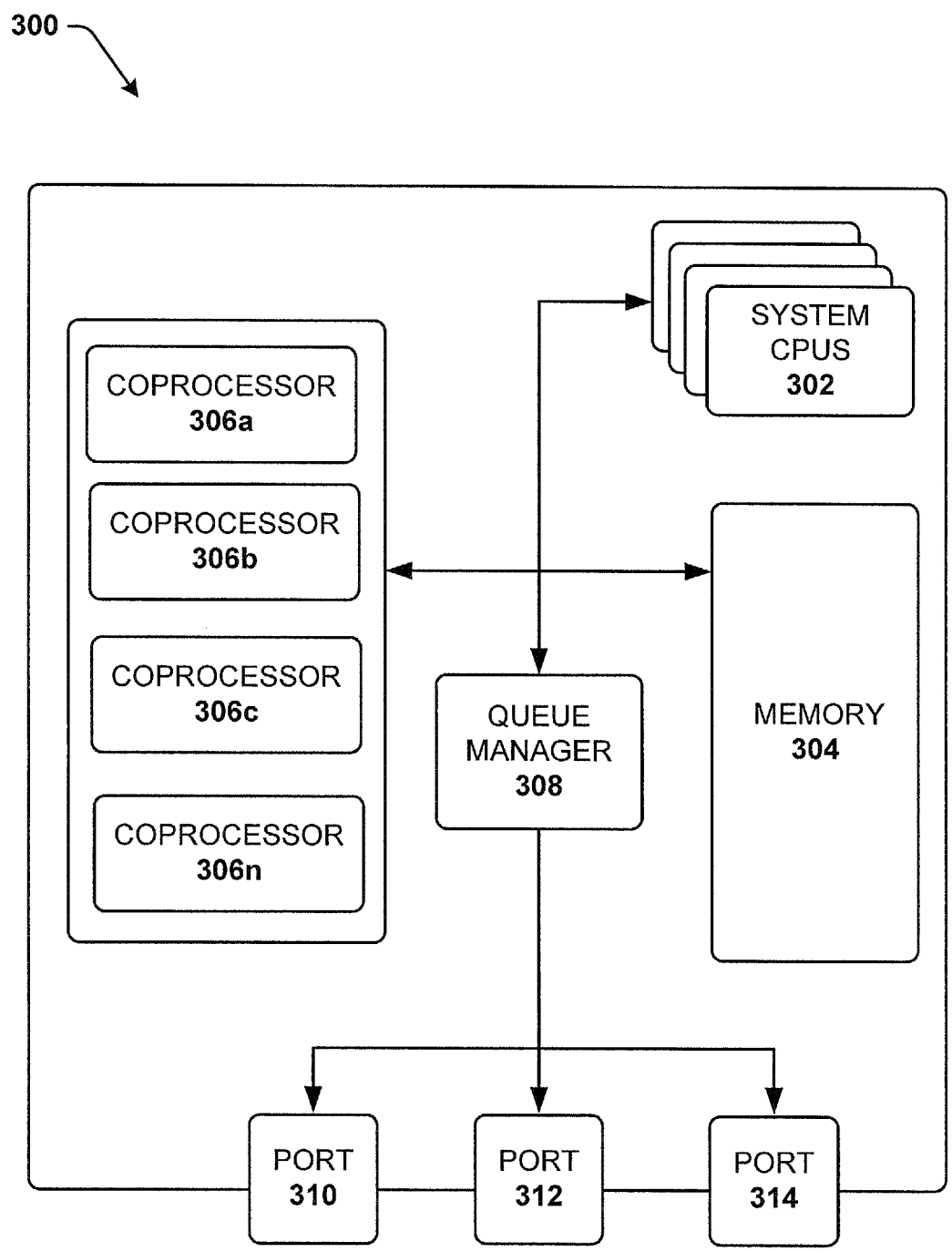
FIG. 3 is a block diagram illustrating an example, non-limiting embodiment of a server on a chip that performs data segmentation in accordance with various aspects described herein.

Turning now to FIG. 3, illustrated is a block diagram of an example, non-limiting embodiment of a server on a chip 300 that performs data segmentation. Server on a Chip or System on a Chip (SoC) 300 includes a plurality of coprocessors 306(a), 306(b), 306(c), through 306(n) that segment data that is prepared by system CPUs 302 to be sent out over network interfaces/ports 310, 312, and/or 314.

The system CPUs 302 (in some embodiments, there can be four CPUs) can be configured for sending a batch of data over a network via the network interfaces 310, 312, and/or 314. The system CPUs can store the batch of data in a memory 304 and generate header information that is associated with the system CPUs 302 and where the header information specifies an IP address and a size of the batch of data. The header information can also specify a location in memory 304 where the batch of data is stored so that the coprocessors 306(a)-(n) can retrieve the batch of data.

The coprocessors 306(a)-(n) can be configured for receiving the header information and splitting the batch of data into segments, where the size of the segments is based on a maximum transmission unit size of the network interface of network interfaces 310, 312, and/or 314 which the segments are to be sent via. Once the batch of data is split into the segments, the coprocessors 306(a)-(n) attach the header information to each of the segments and a sequential number field of the header information is adjusted based on the number of segments. By way of example, if there are N segments, the sequential number fields of the N segments can be numbered 1/N, 2/N, . . . N/N.

In an embodiment, a queue manager 308 can be provided to send the segments to the address specified in the header information. The queue manager 308 can receive the segments from coprocessors 306(a)-(n) and determine which network port 310, 312, and/or 314 to send the segmented data to based on the destination address in the header information/metadata associated with the segments. For example, if the destination address specified in a segment is reached by sending data via network interface/port 310, queue manager 308 forwards the segments to network interface/port 310. In other embodiments, the queue manager 308 facilitates communications between coprocessors 306(a)-(n), system CPUs 302, and network ports 310, 312, 314.

In some embodiments, the system CPUs 302 can prepare a plurality of batches of data and coprocessors 306(a)-(n) can segment the plurality of batches of data in parallel. The coprocessors 306(a)-(n) can then send a plurality of the segmented batches of data as a packet of data over one or more of the network interfaces 310, 312, and/or 314.

A device driver associated with system CPUs 302 can be configured for forwarding the header information associated with the batch of data from the memory 304 to the coprocessors 306(a)-(n) in response to receiving a device driver call from the system CPUs 302. In some embodiments, the device driver forwards the header information to the coprocessors 306(a)-(n) via the queue manager 308. The queue manager 308 can send a message to one or more of the coprocessors 306(a)-(n) that a packet of data is ready to go out. The queue message can contain information about where the packet data is located, the length and/or size of the packet, as well as the destination of the packet. The coprocessors 306(a)-(n) can determine that this is a TCP large single segment based on header information in the packet of data. The coprocessors 306(a)-(n) also know the starting sequence number of the TCP segment as well as the MTU size of the outgoing network interface/port 310, 312, or 314m and so the coprocessors 306(a)-(n) know how many small segments it will need to send out to the interface for the large single segment.

In an embodiment the coprocessors 306(a)-(n) perform the following procedure when performing TCP segmentation offload: 1) read the packet's Ethernet header, IPv4 header, and TCP header; 2) send the split packet to the network port 310, 312, or 314; 3) attach the same Ethernet header, IPv4 header, and TCP header to each of the segments; 4) increment the next read pointer in the large packet buffer by incrementing it by the size of data sent out; 5) adjust the TCP header's sequential number field for each segment; and 6) adjust the IPv4 header's sequential number field for each packet that is sent out. In this way, the large packet is sent out as multiple MTU sized TCP segments.

Figure 4:
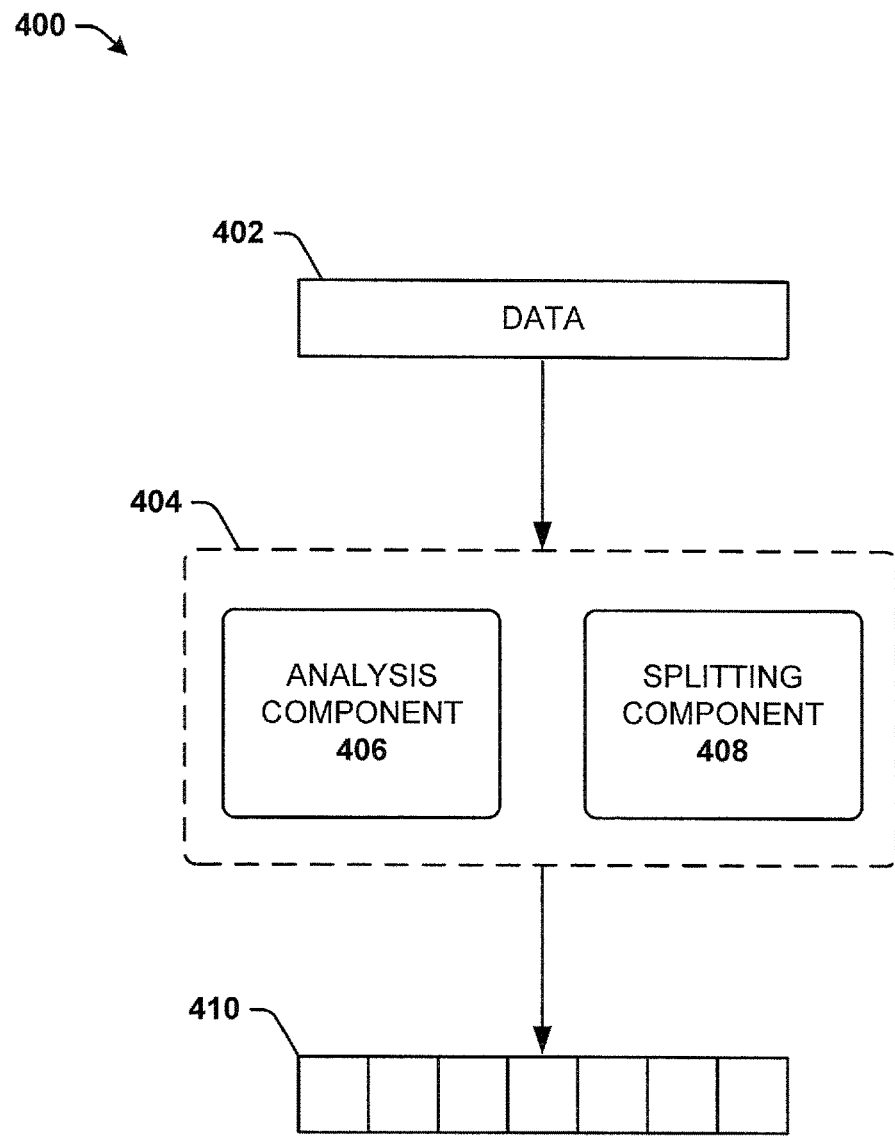
FIG. 4 is a block diagram illustrating an example, non-limiting embodiment of a system that performs data segmentation in accordance with various aspects described herein.

Turning now to FIG. 4, illustrated is a block diagram of an example, non-limiting embodiment of a system 400 that performs data segmentation. System 400 includes a coprocessor 404 executing components configured to perform data segmentation. Coprocessor 404 receives data 402 from a system memory (e.g., system memory 102) and splits the data 402 into segments 410 before sending the segments out of one of network interfaces (e.g., ports 106, 108, or 110).

In an embodiment, coprocessor 404 can be running an application that is configured for performing TCP segmentation. The coprocessor 404 can receive a call from a device driver associated with a system processor (e.g. system CPU 302), and the device driver call can include header information.

Analysis component 406 can be provided to analyze the header information and determine the location in the system memory that the data 402 is stored at. The analysis component 406 can also determine a size of the data 402 as well as a starting sequence number in the header information. Analysis component 406 can also determine a destination of the data 402, and based on the destination, determine which network port to send the data 402 out from. Based on the port, the analysis component 406 can determine the MTU size associated with the port and determine how many segments the data 402 has to be broken into by dividing the size of the data 402 by the MTU size of the network port.

Splitting component 408 can be configured to split the data 402 into segmented data 410. The number of segments that the splitting component 408 splits the data 402 is based on the calculations performed by the analysis component 406.

Figure 5:
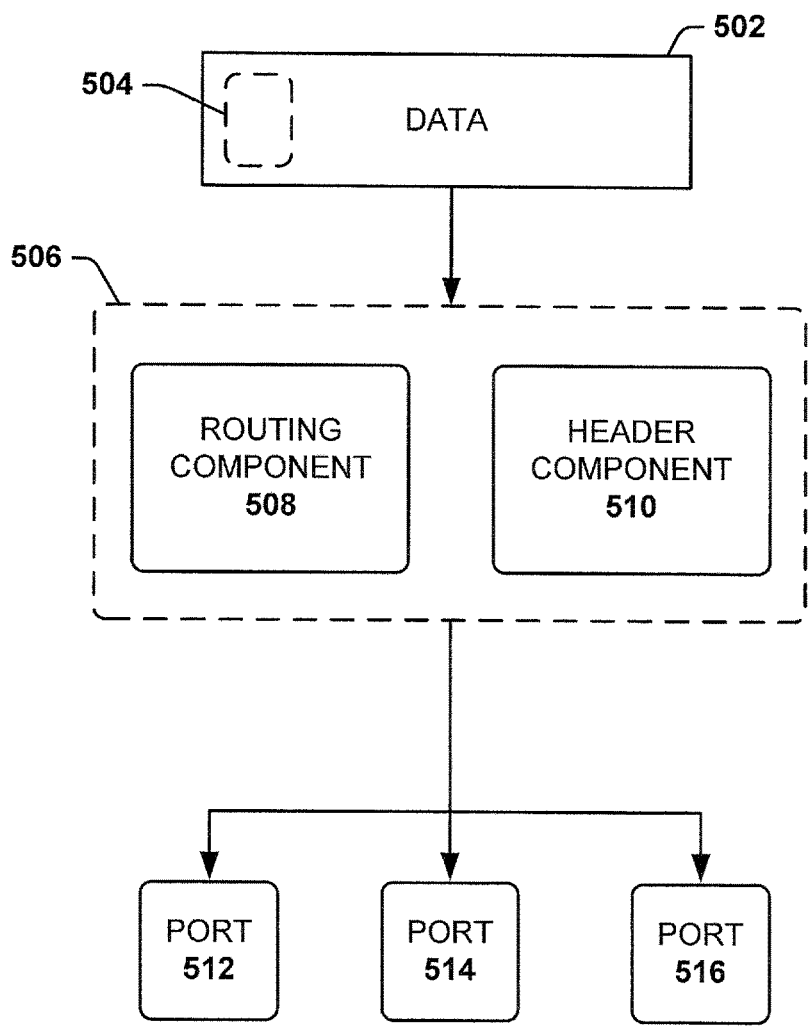
FIG. 5 is a block diagram illustrating an example, non-limiting embodiment of a system that performs data segmentation in accordance with various aspects described herein.

Turning now to FIG. 5, illustrated is a block diagram of an example, non-limiting embodiment of a system 500 that performs data segmentation. System 500 includes a coprocessor 506 executing components configured to perform data segmentation. Coprocessor 506 receives data 502 from a system memory (e.g., system memory 102) and splits the data 502 into segmented packets before sending the segmented packets out of one of ports 512, 514, and/or 516.

The data 502 can include header information 504 that indicates a destination of the data as well as other pertinent information about the data such as location in memory, and size of the data. A routing component 508 can be configured to direct the segmented packets to the correct port based on the header information 504.

A header component 510 can attach the header information, both the TCP header information and the IPv4 header information to each of the segments of data that the coprocessor 506 splits. The header component 510 can also increment a sequential number field of each of the headers per segment or per packet.

Figure 6:
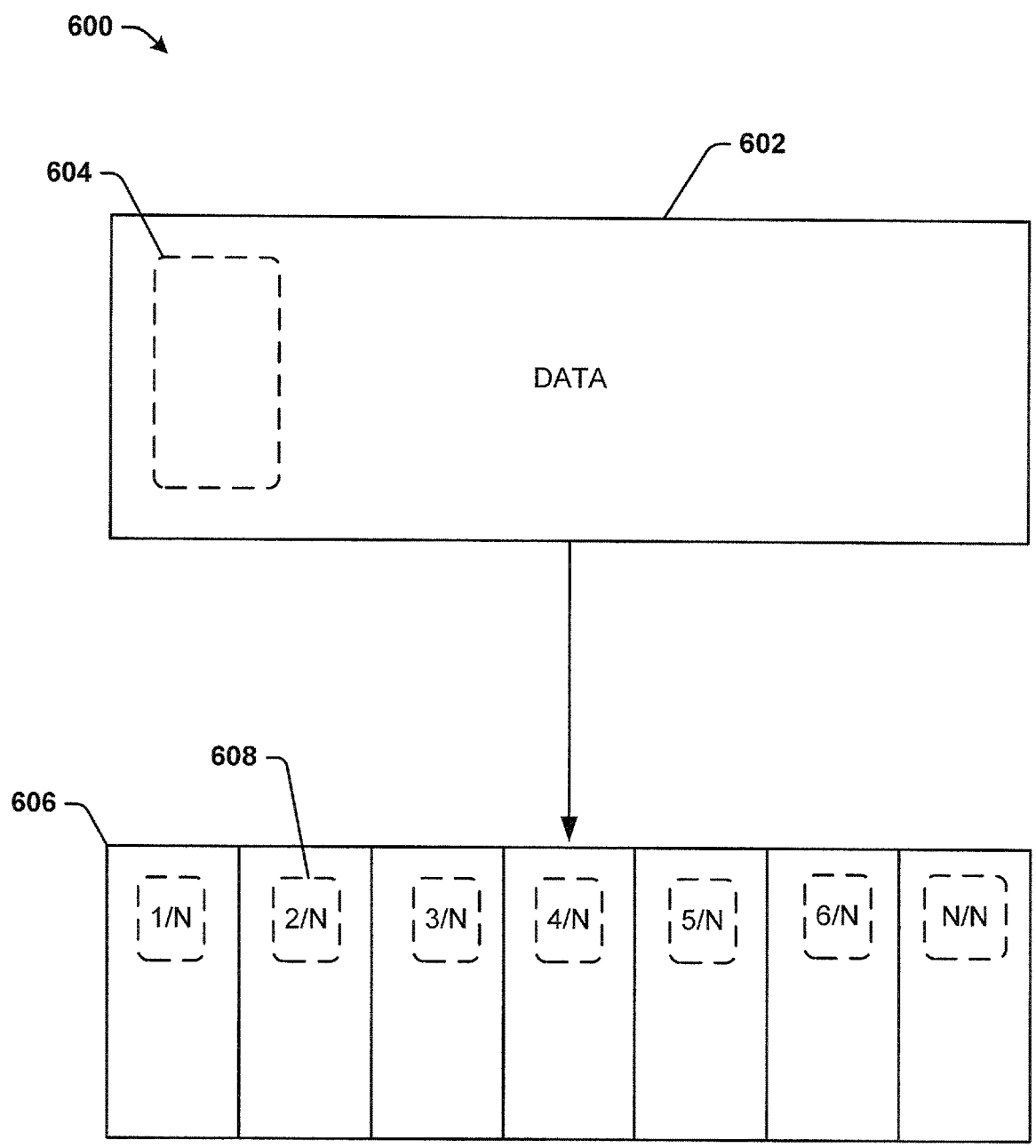
FIG. 6 is a block diagram illustrating an example, non-limiting embodiment showing segmented data in accordance with various aspects described herein.

FIG. 6 displays a representative diagram showing header information on pre-segmented data 602 and segmented data 606. After processing by the coprocessor(s) (e.g. coprocessor 104), the data 602 has been segmented into a number of segmented packets 606, wherein the size and number of the segmented packets are based on the MTU of the associated network interface and size of the data 602 respectively.

Header 604 in the data 602 is replicated by the coprocessor and attached to each segment 606. The header 608 that is attached to each segment includes a sequential number field indicating how many segments are in the sequence as well as which number in the sequence the particular segment is. For instance, as shown in FIG. 6, if there are N segments, each of the segments in segmented data 606 will have a sequential number identifying the segments, as 1/N, 2/N, N/N. Both the TCP headers and IPv4 headers can include sequential number fields, where the TCP headers increment the numbers per segment, and the IPv4 headers increment the numbers per packet.

Figure 7:
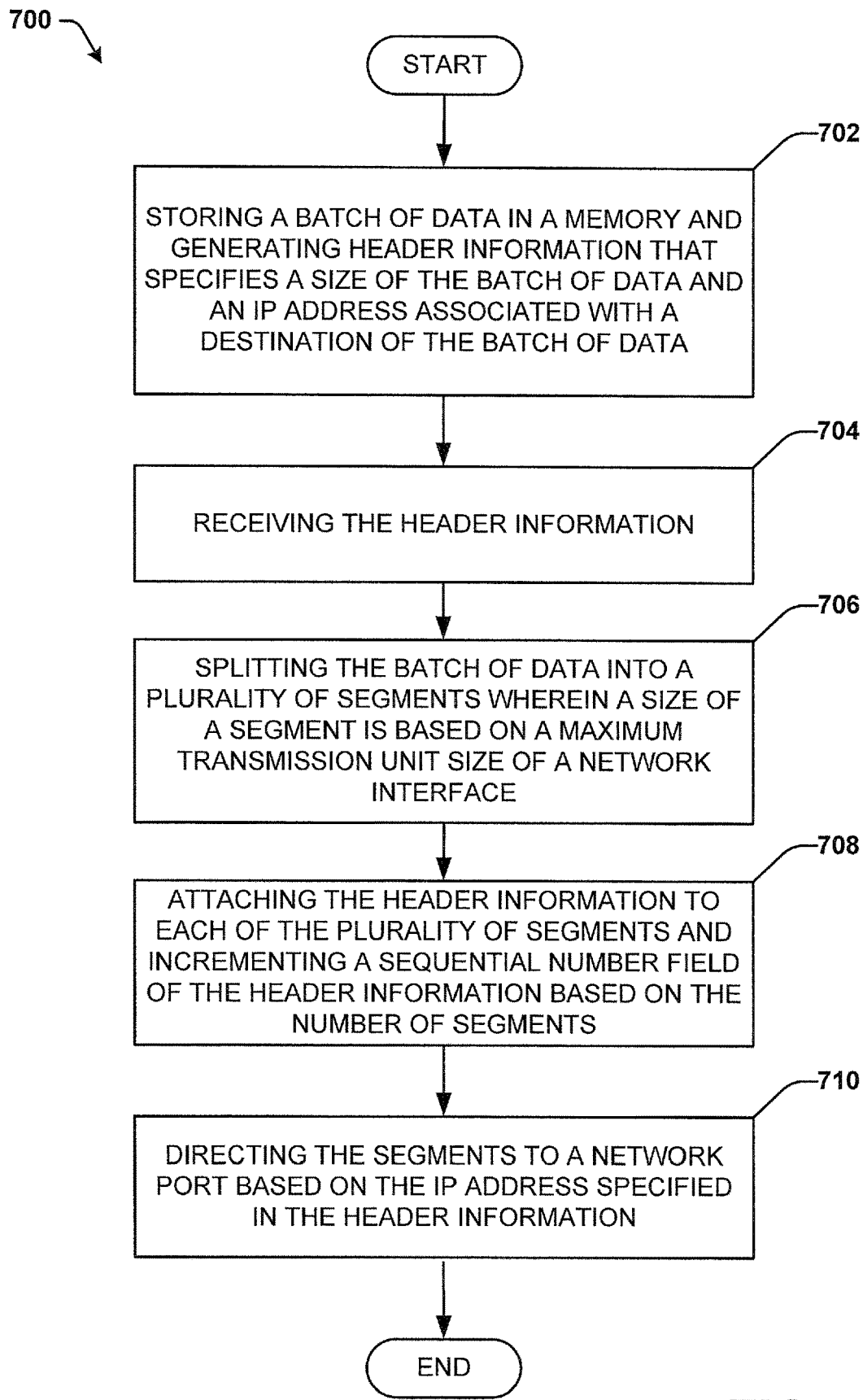
FIG. 7 illustrates a flow diagram of an example, non-limiting embodiment of a method for segmenting data.
Figure 8:
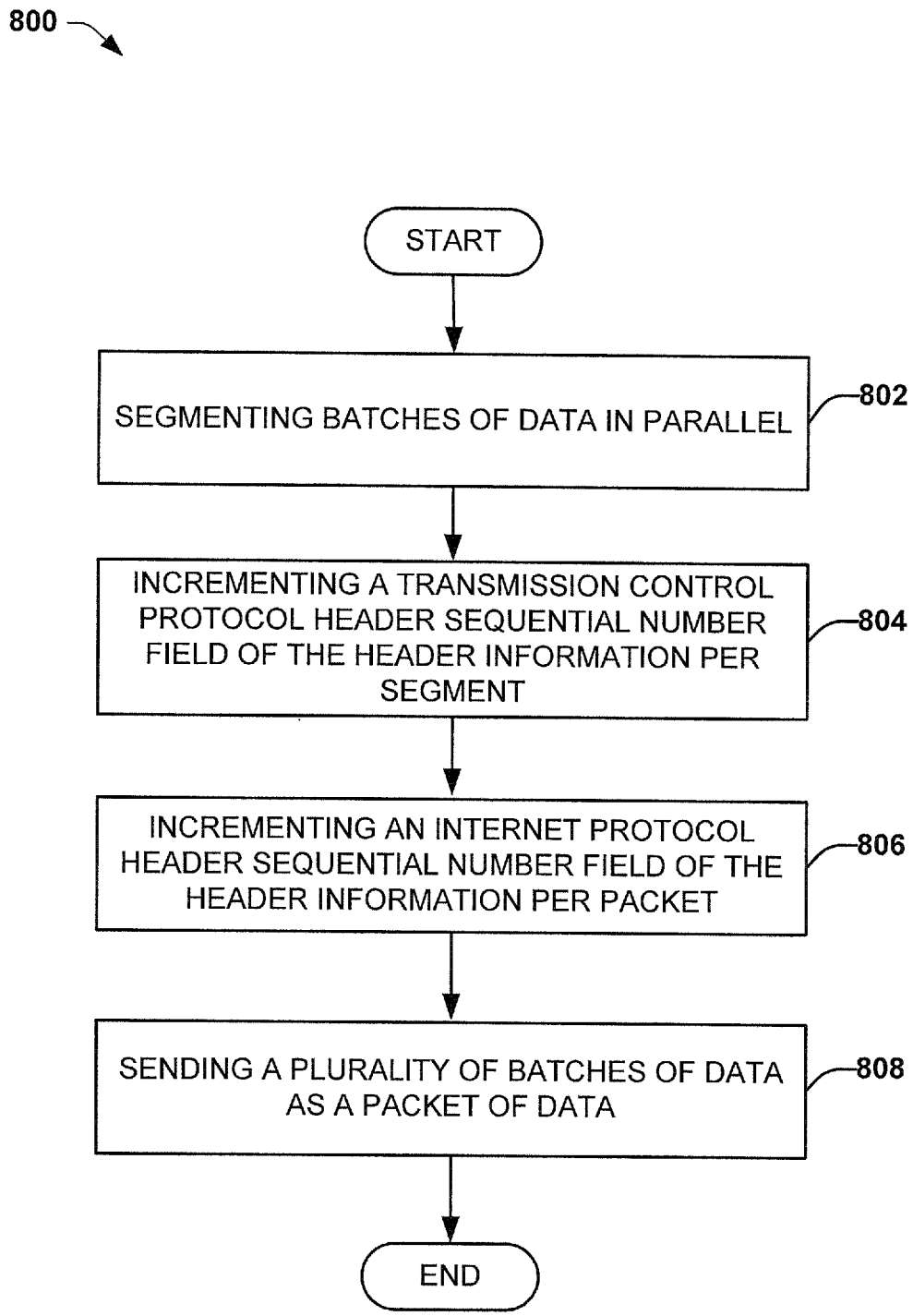
FIG. 8 illustrates a flow diagram of an example, non-limiting embodiment of a method for segmenting data.

FIGS. 7-8 illustrate processes in connection with the aforementioned systems. The process in FIG. 8 can be implemented for example by systems 100, 200, 300, 400, and 500 and illustrated in FIGS. 1-5 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 illustrates a flow diagram of an example, non-limiting embodiment of a computer implemented method for segmenting data. Method 700 can start at 702 where a batch of information is stored in a memory and header information is generated that specifies a size of the batch of data and an IP address associated with a destination of the batch of data. In some embodiments, the header information can also indicate a location in the memory that the batch of information is located. At 704, the header information is received.

In some embodiments the header information is received in response to a device driver call received from a system processor.

At 706, the batch of data is received from the memory, and split into a plurality of segments, wherein a size of a segment is based on a maximum transmission unit size of a network interface. The MTU size is the largest a packet of information can be that can be sent over the network. In an embodiment, the MTU size of is 1518 bytes while the size of the batch of data is 64 KB. Therefore, the number of segments generated is at least 44.

At 708, the header information is attached to each of the plurality of segments and a sequential number field of the header information is incremented based on the number of segments. In an embodiment, there are N segments and therefore each of the segments will have a sequential number identifying the segments, as 1/N, 2/N, N/N. Both the TCP headers and IPv4 headers can include sequential number fields, where the TCP headers increment the numbers per segment, and the IPv4 headers increment the numbers per packet. At 710, the segments are directed to a network port based on the IP address specified in the header information.

FIG. 8 illustrates a flow diagram of an example, non-limiting embodiment of a method for segmenting data. Method 800 can begin at 802, where batches of data are segmented in parallel. At 804, a transmission control protocol header sequential number field of the header information is incremented per segment, and at 807, an internet protocol header sequential number field of the header information is incremented per packet. At 808, the plurality of batches of data are sent as a packet of data.

Example Computing Environment

Figure 9:
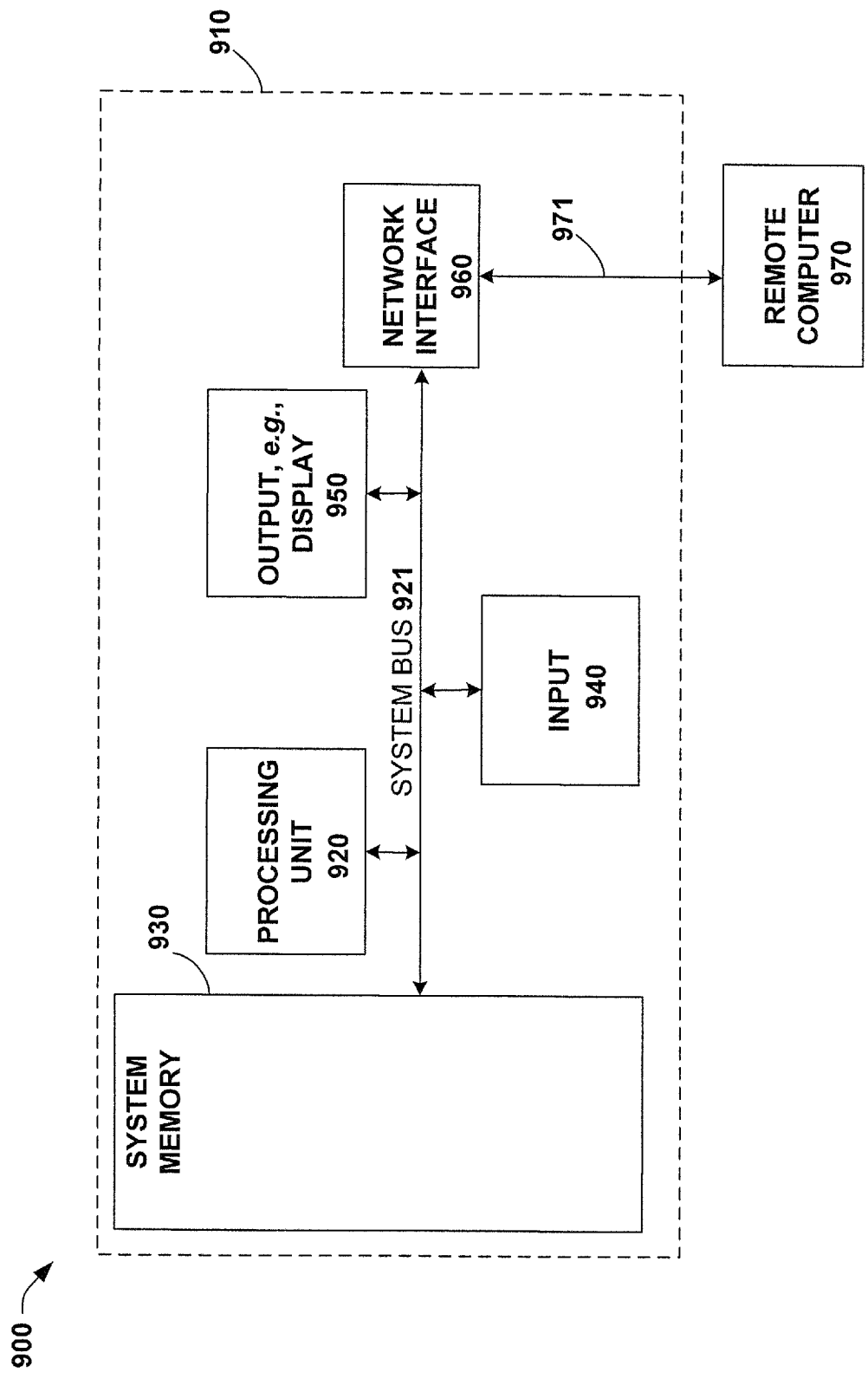
FIG. 9 illustrates a block diagram of an example electronic computing environment that can be implemented in conjunction with one or more aspects described herein.

As mentioned, advantageously, the techniques described herein can be applied to any device where it is desirable to facilitate the execution of TCP segmentation offload. It is to be understood, therefore, that handheld, portable and other computing devices and computing objects of all kinds are contemplated for use in connection with the various non-limiting embodiments. Accordingly, the below general purpose remote computer described below in FIG. 9 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 9 thus illustrates an example of a suitable computing system environment 900 in which some aspects of the disclosed subject matter can be implemented, although as made clear above, the computing system environment 900 is only one example of a suitable computing environment for a device and is not intended to suggest any limitation as to the scope of use or functionality of the disclosed subject matter. Neither should the computing environment 900 be interpreted as having any dependency or requirement relating to any one or combination of components illustrated in the exemplary operating environment 900.

With reference to FIG. 9, an exemplary device for implementing the disclosed subject matter includes a general-purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures.

Computer 910 typically includes a variety of computer readable media. Computer readable media can be any available media that can be accessed by computer 910. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media typically embodies computer readable instructions, data structures, program modules, or other data in a modulated data signal such as a carrier wave or other transport mechanism and includes any information delivery media.

The system memory 930 may include computer storage media in the form of volatile and/or nonvolatile memory such as read only memory (ROM) and/or random access memory (RAM). A basic input/output system (BIOS), containing the basic routines that help to transfer information between elements within computer 910, such as during start-up, may be stored in memory 930. Memory 930 typically also contains data and/or program modules that are immediately accessible to and/or presently being operated on by processing unit 920. By way of example, and not limitation, memory 930 may also include an operating system, application programs, other program modules, and program data.

The computer 910 may also include other removable/non-removable, volatile/nonvolatile computer storage media. For example, computer 910 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 921 through a non-removable memory interface such as an interface, and a magnetic disk drive or optical disk drive is typically connected to the system bus 921 by a removable memory interface, such as an interface.

A user can enter commands and information into the computer 910 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 920 through user input 940 and associated interface(s) that are coupled to the system bus 921, but may be connected by other interface and bus structures, such as a parallel port, game port, or a universal serial bus (USB). A graphics subsystem can also be connected to the system bus 921. A projection unit in a projection display device, or a HUD in a viewing device or other type of display device can also be connected to the system bus 921 via an interface, such as output interface 950, which may in turn communicate with video memory. In addition to a monitor, computers can also include other peripheral output devices such as speakers which can be connected through output interface 950.

The computer 910 can operate in a networked or distributed environment using logical connections to one or more other remote computer(s), such as remote computer 970, which can in turn have media capabilities different from device 910. The remote computer 970 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 910. The logical connections depicted in FIG. 9 include a network 971, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 910 can be connected to the LAN 971 through a network interface or adapter. When used in a WAN networking environment, the computer 910 can typically include a communications component, such as a modem, or other means for establishing communications over the WAN, such as the Internet. A communications component, such as wireless communications component, a modem and so on, which can be internal or external, can be connected to the system bus 921 via the user input interface of input 940, or other appropriate mechanism. In a networked environment, program modules depicted relative to the computer 910, or portions thereof, can be stored in a remote memory storage device. It will be appreciated that the network connections shown and described are exemplary and other means of establishing a communications link between the computers can be used.

Example Networking Environment

Figure 10:
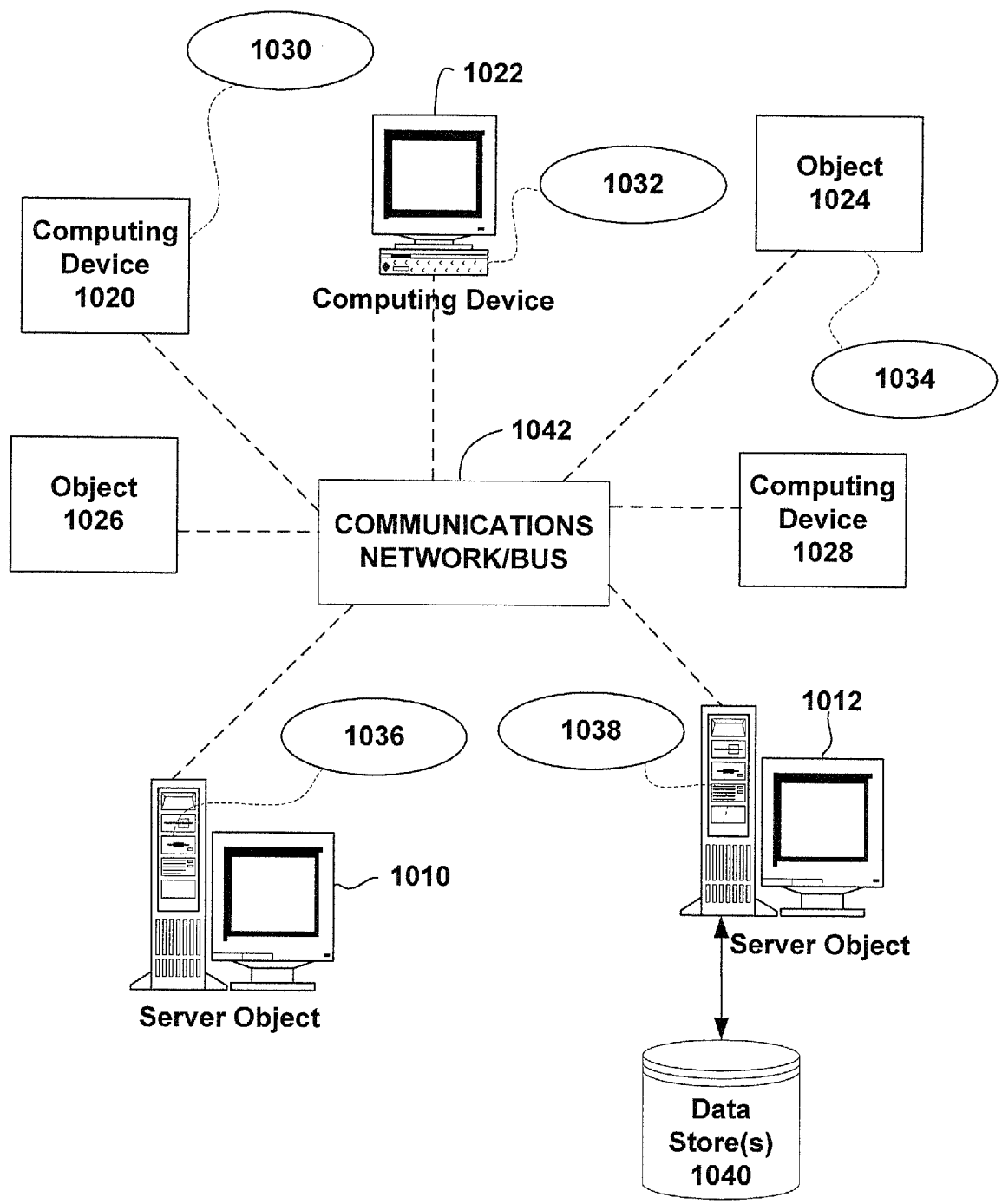
FIG. 10 illustrates a block diagram of an example data communication network that can be operable in conjunction with various aspects described herein.

FIG. 10 provides a schematic diagram of an exemplary networked or distributed computing environment. The distributed computing environment comprises computing objects 1010, 1012, etc. and computing objects or devices 1020, 1022, 1024, 1026, 1028, etc., which may include programs, methods, data stores, programmable logic, etc., as represented by applications 1030, 1032, 1034, 1036, 1038 and data store(s) 1040. It can be appreciated that computing objects 1010, 1012, etc. and computing objects or devices 1020, 1022, 1024, 1026, 1028, etc. may comprise different devices, including microprocessor 512, or similar devices depicted within the illustrations, or other devices such as a mobile phone, personal digital assistant (PDA), audio/video device, MP3 players, personal computer, laptop, etc. It should be further appreciated that data store(s) 1040 can include system memory 102, 202, or 304, or other similar data stores disclosed herein.

Each computing object 1010, 1012, etc. and computing objects or devices 1020, 1022, 1024, 1026, 1028, etc. can communicate with one or more other computing objects 1010, 1012, etc. and computing objects or devices 1020, 1022, 1024, 1026, 1028, etc. by way of the communications network 1042, either directly or indirectly. Even though illustrated as a single element in FIG. 10, communications network 1042 may comprise other computing objects and computing devices that provide services to the system of FIG. 10, and/or may represent multiple interconnected networks, which are not shown. Each computing object 1010, 1012, etc. or computing object or devices 1020, 1022, 1024, 1026, 1028, etc. can also contain an application, such as applications 1030, 1032, 1034, 1036, 1038, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 10, as a non-limiting example, computing objects or devices 1020, 1022, 1024, 1026, 1028, etc. can be thought of as clients and computing objects 1010, 1012, etc. can be thought of as servers where computing objects 1010, 1012, etc., acting as servers provide data services, such as receiving data from client computing objects or devices 1020, 1022, 1024, 1026, 1028, etc., storing of data, processing of data, transmitting data to client computing objects or devices 1020, 1022, 1024, 1026, 1028, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1042 or bus is the Internet, for example, the computing objects 1010, 1012, etc. can be Web servers with which other computing objects or devices 1020, 1022, 1024, 1026, 1028, etc. communicate via any of a number of known protocols, such as the hypertext transfer protocol (HTTP). Computing objects 1010, 1012, etc. acting as servers may also serve as clients, e.g., computing objects or devices 1020, 1022, 1024, 1026, 1028, etc., as may be characteristic of a distributed computing environment.

Reference throughout this specification to "one embodiment," "an embodiment," "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, NAND and NOR memory refer to two types of flash memory based on the NAND and NOR logic gates that they respectively use. The NAND type is primarily used in main memory cards, USB flash drives, solid-state drives, and similar products, for general storage and transfer of data. The NOR type, which allows true random access and therefore direct code execution, is used as a replacement for the older EPROM and as an alternative to certain kinds of ROM applications. However, NOR flash memory can emulate ROM primarily at the machine code level; many digital designs need ROM (or PLA) structures for other uses, often at significantly higher speeds than (economical) flash memory may achieve. NAND or NOR flash memory is also often used to store configuration data in numerous digital products, a task previously made possible by EEPROMs or battery-powered static RAM.

As utilized herein, terms "component," "system," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

Other than where otherwise indicated, all numbers, values and/or expressions referring to quantities of items such as memory size, etc., used in the specification and claims are to be understood as modified in all instances by the term "about."

What is claimed is:

1. A server on a chip, comprising:
a plurality of coprocessors that segment batches of data in parallel;
a system processor configured for storing a batch of data in a memory and generating header information specifying an IP address for the batch of data and a size of the batch of data;
wherein a coprocessor of the plurality of coprocessors is configured for receiving the header information and splitting the batch of data into a plurality of segments, wherein a size of a segment is based on a maximum transmission unit size of a network interface, and wherein the coprocessor of the plurality of coprocessors is further configured for attaching the header information to the segments and adjusting a sequential number field of the header information based on the plurality of segments;

a queue manager configured for sending the segments to the address specified in the header information and further configured for facilitating communication between the plurality of coprocessors;

a device driver configured for forwarding header information associated with the batch of data from the memory to the coprocessor in response to receiving a device driver call from the system processor, wherein the device driver forwards the header information to the coprocessor via the queue manager;

wherein the system processor, the plurality of coprocessors, the queue manager, and the device driver reside on a single chip.

2. The server of claim 1, wherein the queue manager routes the segments to a network port on the server based on the address specified.

3. The server of claim 1, wherein the header information comprises at least one of an Ethernet header, transmission control protocol header, or an internet protocol header.

4. The server of claim 3, wherein each of the headers comprise distinct sequential number fields.

5. The server of claim 4, wherein a transmission control protocol header sequential number field is incremented per segment, and an internet protocol header sequential number field is incremented per packet.

6. The server of claim 1, wherein the segments are a packet of data.

7. The server of claim 1, wherein the coprocessor is further configured for gathering a plurality of batches of data and sending them as a packet of data.

8. The server of claim 1, wherein the sequential number field of the header information indicates a total number of segments and a sequence number of each of the segments.

9. A computer implemented method, comprising:

storing, by a system processor, a batch of data in a memory and generating header information that specifies a size of the batch of data and an IP address associated with a destination of the batch of data;

segmenting, by a plurality of coprocessors residing on a single chip along with the system processor, batches of data in parallel, wherein the segmenting comprises:

receiving, by a coprocessor of the plurality of coprocessors, the header information;

splitting, by the coprocessor, the batch of data into a plurality of segments, wherein a size of a segment is based on a maximum transmission unit size of a network interface; and attaching, by the coprocessor, the header information to each of the plurality of segments and incrementing a sequential number field of the header information based on the number of segments;

directing, by a queue manager residing on the single chip, the segments to a network port based on the IP address specified in the header information;

forwarding, by a device driver residing on the single chip, header information associated with the batch of data from the memory to a coprocessor in response to receiving a device driver call from the system processor, wherein the device driver forwards the header information to the coprocessor via the queue manager; and receiving, by the plurality of coprocessors, a queue message comprising information about where the batch of data is located, a length of the batch of data, the size of the batch of data or a destination of the batch of data.

10. The method of claim 9, the segmenting further comprising:

determining, by the coprocessor, the maximum transmission unit size based on the network port associated with the IP address specified in the header information.

11. The method of claim 9, the segmenting further comprising:

incrementing a transmission control protocol header sequential number field of the header information per segment; and incrementing an internet protocol header sequential number field of the header information per packet.

12. The method of claim 9, the segmenting further comprising:

sending a plurality of batches of data as a packet of data.

* * * * *